United States Patent
Kaneko

(10) Patent No.: US 11,923,110 B2
(45) Date of Patent: Mar. 5, 2024

(54) CABLE, CONNECTION STRUCTURE PROVIDED WITH CABLE, WIRE HARNESS, AND MOORED MOBILE BODY

(71) Applicant: FURUKAWA ELECTRIC CO., LTD., Tokyo (JP)

(72) Inventor: Hiroshi Kaneko, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 240 days.

(21) Appl. No.: 17/414,656

(22) PCT Filed: Sep. 26, 2019

(86) PCT No.: PCT/JP2019/037816
§ 371 (c)(1),
(2) Date: Jun. 16, 2021

(87) PCT Pub. No.: WO2020/129344
PCT Pub. Date: Jun. 25, 2020

(65) Prior Publication Data
US 2022/0059251 A1    Feb. 24, 2022

(30) Foreign Application Priority Data
Dec. 18, 2018   (JP) .................................. 2018-235967

(51) Int. Cl.
*H01B 7/00* (2006.01)
*B64C 39/02* (2023.01)
(Continued)

(52) U.S. Cl.
CPC ......... *H01B 7/0009* (2013.01); *B64C 39/022* (2013.01); *B64F 3/02* (2013.01);
(Continued)

(58) Field of Classification Search
None
See application file for complete search history.

(56) References Cited

U.S. PATENT DOCUMENTS 2,578,735 A * 12/1951 Park .................. F42B 22/10
                                                    254/389
3,587,310 A *  6/1971 Brown ................ B63B 21/20
                                                    174/68.3
(Continued)

FOREIGN PATENT DOCUMENTS

CN          207116034 U       3/2018
FR          2980168 A1 *      3/2013 ............... B64B 1/50
(Continued)

OTHER PUBLICATIONS

International Search Report dated Dec. 17, 2019 in PCT/JP2019/037816 filed on Sep. 26, 2019, 2 pages.
(Continued)

*Primary Examiner* — Krystal Robinson
(74) *Attorney, Agent, or Firm* — Oblon, McClelland, Maier & Neustadt, L.L.P.

(57) ABSTRACT

The purpose of the present invention is to provide a cable used to at least moor a moving body to be moored and supply power thereto, such that weight of the whole cable can be reduced. A cable according to the present invention connects a moving body to be moored to a unit assembly including a power supply unit. The cable is used to at least moor the moving body to be moored to the unit assembly and supply power from the power supply unit to the moving body to be moored. The cable includes a conductor constituted with element wires, and at least part of the element wires is a high-strength aluminum-based conductor.

15 Claims, 1 Drawing Sheet

(51) Int. Cl.
  *B64F 3/02* (2006.01)
  *H02G 11/02* (2006.01)
  *H01B 1/02* (2006.01)
  *H01R 4/18* (2006.01)
  *H01R 4/70* (2006.01)
(52) U.S. Cl.
  CPC ............ *H02G 11/02* (2013.01); *H01B 1/023* (2013.01); *H01R 4/18* (2013.01); *H01R 4/70* (2013.01)

(56) References Cited

U.S. PATENT DOCUMENTS

| | | | | |
|---|---|---|---|---|
| 5,095,841 | A * | 3/1992 | Santos | B63B 22/18 441/3 |
| 6,106,923 | A * | 8/2000 | Takahashi | H01L 23/5386 428/137 |
| 9,958,566 | B2 * | 5/2018 | Vowles | G01V 3/165 |
| 9,975,632 | B2 * | 5/2018 | Alegria | G08G 5/0039 |
| 11,644,622 | B2 * | 5/2023 | Akiyama | G02B 6/4408 385/99 |
| 11,645,691 | B1 * | 5/2023 | Mishra | B22F 10/85 705/26.62 |
| 2005/0279074 | A1 * | 12/2005 | Johnson | H01B 5/105 57/212 |
| 2005/0279526 | A1 * | 12/2005 | Johnson | H01B 13/0235 174/106 R |
| 2019/0127826 | A1 | 5/2019 | Kaneko et al. | |
| 2020/0024764 | A1 | 1/2020 | Yamauchi et al. | |
| 2023/0116365 | A1 * | 4/2023 | Ciesielczyk | B23P 19/06 174/146 |

FOREIGN PATENT DOCUMENTS

| | | | | |
|---|---|---|---|---|
| JP | 2007-53105 A | 3/2007 | | |
| JP | 2015-181129 A | 10/2015 | | |
| JP | 2016-74257 A | 5/2016 | | |
| JP | 2016-164890 A | 9/2016 | | |
| RU | 2447526 C1 * | 4/2012 | ............... | D07B 1/02 |
| WO | WO 2018/012481 A1 | 1/2018 | | |
| WO | WO 2018/181399 A1 | 10/2018 | | |

OTHER PUBLICATIONS

Office Action dated Aug. 3, 2022, in corresponding Chinese Patent Application No. 201980062441.5 (with English Translation), 20 pages.
Combined Chinese Office Action and Search Report dated Jan. 6, 2022 in Chinese Patent Application No. 201980062441.5 (with unedited computer generated English translation), 17 pages.
Japanese Office Action dated May 9, 2023 in Japanese Patent Application No. 2020-561161 (with unedited computer-generated English Translation), 10 pages.
Chinese Office Action dated May 31, 2023 in Chinese Patent Application No. 201980062441.5 (with unedited computer-generated English Translation), 21 pages.
Construction Vocational Skills Training Textbook, "Tower Crane Driver (Technician)", China Construction Industry Press Feb. 2006, 7 pages (with unedited computer-generated English Translation).
Chinese Office Action dated Jul. 25, 2023 in Chinese Patent Application No. 201980062441.5 (with unedited computer-generated English translation), 34 pages.

* cited by examiner

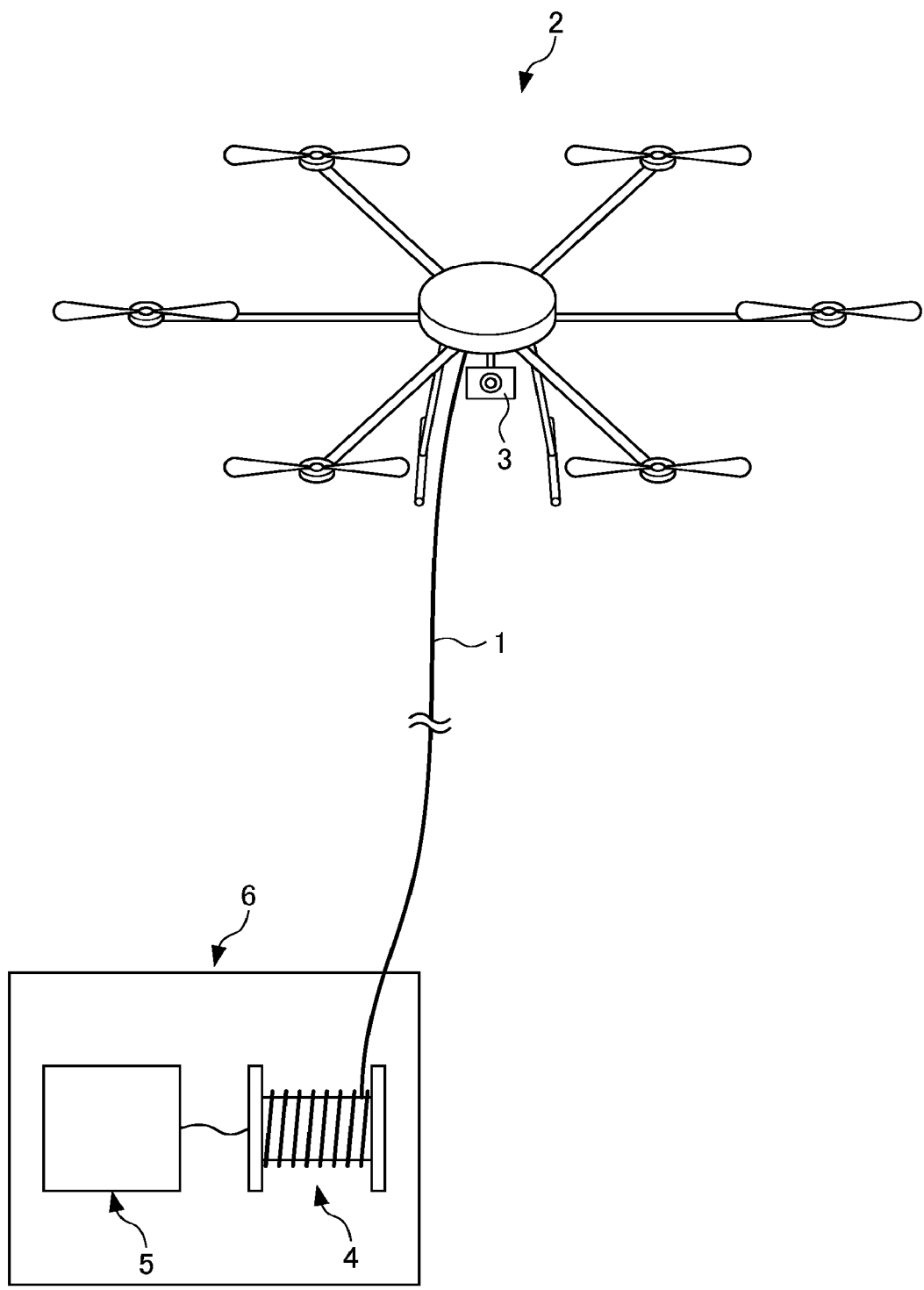

CABLE, CONNECTION STRUCTURE PROVIDED WITH CABLE, WIRE HARNESS, AND MOORED MOBILE BODY

TECHNICAL FIELD

The present invention relates to a cable for connecting a moored mobile body to a unit assembly including a power supply unit, for use at least in mooring of the moored mobile body to the unit assembly and in power supply from the power supply unit to the moored mobile body. The present invention also relates to a connection structure, a wire harness, and a moored mobile body that include the cable.

BACKGROUND ART

Mobile bodies such as drones (unmanned aerial or underwater vehicles that move through remote control or autonomous control) were initially developed for military purposes. However, such mobile bodies are now used also for civil purposes and in various applications. For example, there have been recently developed aerial drones that perform aerial image capture and infrastructure defect review through infrared irradiation as well as disaster relief, and underwater drones that perform image capture of fish swimming under the sea and marine exploration.

Conventional (aerial) drones that are used for civil purposes are, for example, generally driven using a battery mounted therein (for example, a battery having a six-cell configuration including 3.7 V lithium batteries connected in series). Specifications of drones vary. For example, a drone that is used in aerial image capture has a vehicle weight of approximately 10 kg and a liftable weight of approximately 5 kg to 6 kg.

However, drones using a battery mounted therein as a drive source have a short operating time of not more than approximately 20 minutes, and thus are limited to short-term applications.

If the drones are enabled to operate for unlimited hours, therefore, applications thereof are expected to become more flexible. For example, the drones can be utilized for continuous acquisition of data of images captured from the air or for 24-hour crime prevention.

In order to enable a drone to operate for unlimited hours, for example, it is useful to adopt a configuration such as described in Patent Document 1 including: an on-ground part to be placed on the ground; a composite cable having a first end connected to the on-ground part; and a flying body connected to a second end of the composite cable. In this configuration, the composite cable includes two power-supplying conductive wires, one or two optical fibers, and a tension member made of one or more aramid fibers. The flying body is moored to the on-ground part using the composite cable, and power is fed from the on-ground part to the flying body through the composite cable.

However, in Patent Document 1, stranded soft copper wires having a specific gravity of as large as 8.9 g/cm$^3$ are used as the conductive wires (conductors) of the composite cable. Naturally, the composite cable has a large overall weight, and a force of gravity equivalent to the large weight of the cable constantly acts on the drone moving. As a result, the liftable weight of the drone decreases, preventing the drone from rising up to a distant location. Likewise, in the case of an underwater drone, the force required for the drone to move increases with an increase in the weight of the cable.

Patent Document 1: Japanese Unexamined Patent Application, Publication No. 2016-74257

DISCLOSURE OF THE INVENTION

Problems to be Solved by the Invention

It is an object of the present invention to provide a cable that is used at least in mooring of and power supply to a moored mobile body, and that achieves a reduction in the weight thereof. It is also an object of the present invention to provide a connection structure, a wire harness, and a moored mobile body that include the cable.

Means for Solving the Problems

The inventor made intensive studies and considered adapting a cable for mooring of and power supply to a drone at a distance up in the air by using, as a conductor of the cable, a novel high-strength aluminum-based conductor having a high tensile strength compared to a conventional aluminum-based conductor instead of a soft copper conductor. As a result, the inventor found that the use of the novel high-strength aluminum-based conductor enables the cable to achieve a significant reduction in the overall weight thereof while having a tensile strength greater than or comparable to the soft copper conductor, so that the drone can ascend to a distant location. Furthermore, the cable enables mooring of and power supply to the drone while having excellent resistance to fatigue due to repeated releasing (unwinding) and winding of the cable from and onto a reel accompanying takeoff and landing of the drone. Based on the findings, the inventor completed the present invention.

That is, the gist and the configuration of the present invention are as described below.

(1) A cable for connecting a moored mobile body to a unit assembly including a power supply unit, for use at least in mooring of the moored mobile body to the unit assembly and in power supply from the power supply unit to the moored mobile body, the cable including a conductor constituted with element wires, at least part of the element wires being a high-strength aluminum-based conductor.

(2) The cable described in (1), wherein the high-strength aluminum-based conductor has a tensile strength of 180 MPa or more.

(3) The cable described in (1) or (2), wherein the high-strength aluminum-based conductor is composed of an 8000-series aluminum alloy.

(4) The cable described in (1) or (2), wherein the high-strength aluminum-based conductor is composed of a 5000-series aluminum alloy.

(5) The cable described in (1) or (2), wherein the high-strength aluminum-based conductor is composed of a 6000-series aluminum alloy.

(6) The cable described in any one of (1) to (5), wherein the high-strength aluminum-based conductor has a fibrous metal structure in which crystal grains uniformly extend in an extending direction of the high-strength aluminum conductor, and the crystal grains have an average value of less than or equal to 500 nm with respect to a dimension perpendicular to a longitudinal direction of the crystal grains on a cross section thereof parallel to the extending direction.

(7) The cable described in any one of (1) to (6), wherein the high-strength aluminum-based conductor has an element wire diameter of less than or equal to 0.35 mm.
(8) The cable described in any one of (1) to (7), wherein the high-strength aluminum-based conductor is coated with copper, nickel, silver, or tin.
(9) The cable described in any one of (1) to (6), wherein the conductor of the cable includes the high-strength aluminum-based conductor and an additional conductor twisted together.
(10) The cable described in any one of (1) to (9), further comprising an optical fiber.
(11) The cable described in any one of (1) to (10), further comprising a tension member.
(12) The cable described in any one of (1) to (11), wherein the unit assembly further includes a winding unit capable of winding and unwinding the cable.
(13) A connection structure including: the conductor of the cable described in any one of (1) to (12); a terminal having a crimp part crimped onto a terminal end of the conductor and a connector part connected to a mating terminal; and an ultraviolet curable resin coating an outer surface region including at least an area where the conductor of the cable and the crimp part are crimped together.
(14) A connection structure including: the cable described in any one of (1) to (12); a terminal having a wire barrel and an insulation barrel; and a sealant embedding part made from a liquid silicone rubber having an elastic modulus in a range of from 0.55 MPa to 0.72 MPa as measured by curing the liquid silicone rubber at 25° C., the terminal being attached to the cable through the wire barrel and the insulation barrel respectively holding a conductor portion and an insulation coating-covered portion of the cable, the terminal being thus integral with the conductor portion and the insulation coating-covered portion, the conductor portion being exposed through removal of the insulation coating from the cable, the sealant embedding part being formed so as to cover the exposed conductor portion having the terminal attached thereto and the insulation coating-covered portion.
(15) A wire harness including: the cable described in any one of (1) to (12); and a crimp terminal crimped onto a terminal end of the cable, the crimp terminal including a crimp part and a sealing part, the crimp part allowing crimping onto a conductor portion of the cable, the crimp part of the crimp terminal being constructed by deforming a plate so as to form at a hollow shape in a cross section and welding the deformed plate having the hollow shape in a longitudinal direction of the crimp part, the sealing part being located on one longitudinal end of the crimp part having the hollow shape and being formed by welding the deformed plate having the hollow shape in a planar overlapped state in a direction intersecting the longitudinal direction of the crimp part.
(16) The wire harness described in (15), comprising a water-repellent layer on a surface region of the conductor portion of the cable located opposite to an opening in the crimp part.
(17) A moored mobile body including the cable described in any one of (1) to (12), the connection structure described in (13) or (14), or the wire harness described in (15) or (16).

Effects of the Invention

The present invention provides a cable that has a tensile strength (tension resistance) sufficient for mooring of a drone even in a situation in which the cable has a length of 100 meters or greater and hangs from the drone which has risen up to a distant location, which is, for example, a location at a height of 100 meters or greater above ground level, and that achieves a reduction in the overall weight thereof and excellent resistance to fatigue due to repeated releasing (unwinding) and winding of the cable from and onto a reel accompanying takeoff and landing of the drone, by using a high-strength aluminum-based conductor for at least part of element wires constituting a conductor of the cable. The present invention also provides a connection structure, a wire harness, and a moored mobile body that include the cable.

BRIEF DESCRIPTION OF THE DRAWINGS

FIG. 1 is a diagram schematically illustrating a situation in which a moored mobile body (aerial drone) in a hovering state is performing areal image capture with a camera while being moored and supplied with power using a cable according to the present invention.

PREFERRED MODE FOR CARRYING OUT THE INVENTION

<Cable of Present Invention>

Next, a preferred embodiment of a cable according to the present invention will be described below. FIG. 1 is a diagram schematically illustrating a situation in which a drone 2, which is a moored mobile body, in a hovering state is performing areal image capture with a camera 3, which is an imaging device, while being moored and supplied with power using a cable 1 according to the present invention.

One end of the cable 1 according to the present invention is connected to a unit assembly 6 fixed to the ground. The unit assembly 6 includes a cable reel 4, which is a winding unit, and a power source 5, which is a power supply unit. The other end of the cable 1 is connected to the drone 2. Thus, the cable 1 is used at least in mooring of the drone 2 to the unit assembly 6 and in power supply from the power source 5 to the drone 2.

At least part of element wires constituting a conductor of the cable 1 according to the present invention needs to be a high-strength aluminum-based conductor. This enables the cable 1 to achieve high tensile strength, excellent fatigue resistance, and a reduction in the overall weight thereof.

The cable 1 is wound around the cable reel 4 through rotation of a take-up roll. In a case where the drone 2 is approaching the vicinity of the unit assembly 6 from afar, for example, the cable 1 released (unwound) from the cable reel 4 is rewound onto the cable reel 4. Thus, a space for accommodating the cable 1 in the unit assembly 6 can be reduced.

Examples of desired properties of the cable 1 for mooring of and power supply to the drone 2 include tensile strength (tension resistance) sufficient for mooring of the drone 2, resistance to cyclic bending (fatigue resistance) due to releasing (unwinding) and winding of the cable 1 from and onto the cable reel 4 accompanying takeoff and landing of the drone 2, high-frequency transmission for data transmission, and electrical conductivity.

Note that the current to flow through the conductor of the cable 1 for the drone 2 can be reduced providing that the conductor of the cable 1 has a configuration that allows the voltage to be increased to a relatively high level (for example, 400 V) for power transmission. It is therefore sufficient that the conductor has a certain degree of electrical conductivity (for example, 35% IACS or more).

As the conductor of the cable 1, for example, an aluminum-based conductor having a small specific gravity (2.7 g/cm$^3$) was used instead of a soft copper conductor in an attempt to reduce the weight of the cable 1.

However, the following issue was found. The conventional aluminum-based conductor has a tensile strength of not more than approximately 160 MPa, which is lower than the tensile strength (approximately 230 MPa) of the soft copper conductor. A portion of the strand forming the conductor of the cable 1 therefore tends to be broken by tension and bending forces repeatedly acting on the conductor due to repeated releasing (unwinding) of the cable 1 from the cable reel 4 and winding of the cable 1 onto the cable reel 4 accompanying takeoff and landing of the drone 2. As a result, the electric resistance of the conductor tends to increase. Based on the issue described above, at least part of the element wires constituting the conductor of the cable 1 according to the present invention is a high-strength aluminum-based conductor.

In order to allow the drone 2 to ascend to a distant location, the cable 3 needs to have a long overall length. However, a conventional stranded soft copper wire has a specific gravity of as large as 8.9 g/cm$^3$, and a cable including such a wire naturally has a large overall weight. By contrast, according to the present invention, the use of the cable 1 including a high-strength aluminum-based conductor as the strand produces a weight reduction effect resulting in a reduction in the force acting on the moving drone 2 due to the weight of the cable 1 and gravity. As a result, the liftable weight of the drone 2 increases, allowing the drone 2 to easily ascend to a higher elevation compared to conventional drones. The weight reduction in the cable 1 results in a decrease in the force required for the drone to move, and is therefore advantageous also in the case of an underwater drone because the force required for the drone to move under the water can be reduced.

As the camera 3 mounted on the drone 2, for example, a recent high-performance camera is preferable, which is capable of image capture from a higher location as having improved performance represented by a resolution of approximately 3 mm with respect to an image captured at a location at a height of 100 m above the ground level. Although the weight of the camera 3 is large, the cable 1 reduced in weight facilitates image capture from a higher location by the drone 2 using the camera 3 mounted thereon by allowing, while mooring and supplying power to, the drone 2 having the camera 3 to ascend to a distant location, which is, for example, a location at a height of 100 m or greater above the ground level, to be in a hovering state (an operating state in which the drone 2 stays still at a point in the air) and easily perform a task such as aerial image capture for a long period of time. The recent high-performance camera therefore enables the drone 2 to acquire information from a wider range within a shorter period of time without moving around all over the wide range, making applications of the drone 2 more flexible.

The cable 1 including the high-strength aluminum-based conductor as the strand has high tensile strength and high fatigue resistance compared to the conventional aluminum-based conductor. The cable 1 can therefore reduce breaking of the strand due to repeated releasing (unwinding) and winding of the cable 1 from and onto the cable reel 4, and a resulting increase in the electric resistance of the cable 1.

In terms of ensuring reliable mooring of the drone with a sufficient force against the tension that acts on the cable when the drone rises, the high-strength aluminum-based conductor preferably has a tensile strength of 180 MPa or more, more preferably 260 MPa or more, further preferably 380 MPa or more, and particularly preferably 500 MPa or more.

The composition of the high-strength aluminum-based conductor is not particularly limited as long as the high-strength aluminum-based conductor has a tensile strength of 180 MPa or more, and may be pure aluminum or an aluminum alloy. In particular, the high-strength aluminum-based conductor is preferably composed of a 5000-series (Al—Mg series), 6000-series (Al—Mg—Si series), or 8000-series (Al—Si—(Cu, Mg) series) aluminum alloy. Preferably, the high-strength aluminum-based conductor has a fibrous metal structure in which crystal grains uniformly extend in an extending direction of the high-strength aluminum conductor, and the crystal grains have an average value of less than or equal to 500 nm with respect to a dimension perpendicular to a longitudinal direction of the crystal grains on a cross section thereof parallel to the extending direction. As a result, the tensile strength of the aluminum-based conductor can be much higher than the conventional aluminum-based conductor.

Preferably, the high-strength aluminum-based conductor has an element wire diameter of less than or equal to 0.35 mm in terms of reducing strain on and around a surface of the conductor when bent.

The high-strength aluminum-based conductor itself sufficiently satisfies desired properties, and can therefore be used uncovered as a cable for mooring of and power supply to a drone and the like. In order to further impart desired properties, the high-strength aluminum-based conductor is preferably coated with copper, nickel, silver, or tin. When coated with another metal by a method such as plating or cladding, the high-strength aluminum-based conductor exerts good bonding characteristic and, at the same time, satisfies all of high tensile strength, high fatigue resistance, and high electrical conductivity as well as when uncoated. The high-strength aluminum-based conductor can produce additional effects such as an effect of reducing contact resistance and an effect of improving corrosion resistance. The coverage is preferably up to approximately 25% of the total area of a cross section of the conductor perpendicular to the extending direction. This is because an overly large coverage reduces the weight reduction effect. The coverage is preferably less than or equal to 15%, more preferably less than or equal to 10%, and further preferably less than or equal to 5%. The high-strength aluminum-based conductor may alternatively be coated with a conventionally-used known material.

Preferably, the conductor of the cable includes the high-strength aluminum-based conductor and an additional conductor twisted together. Examples of additional conductors include copper, copper alloy, piano wire, soft steel wire, hard steel wire, and stainless steel wire. In a case where a particularly high electrical conductivity is needed, soft copper is preferably used as the additional conductor.

In a case where a video needs to be optically transmitted from the camera on the drone, the cable preferably further includes an optical fiber.

In a case where the cable as a whole needs to have tension resistance, the cable preferably further includes a tension member.

<Connection Structure of Present Invention>

It is preferable that the cable described above have, at a terminal end of the conductor thereof, a connection structure including: a terminal having a crimp part crimped onto the terminal end of the conductor and a connector part to be connected to a mating terminal; and an ultraviolet curable resin coating an outer surface region including at least an area where the conductor of the cable and the crimp part are crimped together. This configuration is preferable in terms of preventing electrical corrosion between the high-strength aluminum conductor and the terminal.

It is also preferable that the cable have a connection structure including: a terminal having a wire barrel and an insulation barrel; and a sealant embedding part made from a liquid silicone rubber having an elastic modulus in a range of from 0.55 MPa to 0.72 MPa as measured by curing the liquid silicone rubber at 25° C., in terms of preventing electrical corrosion between the high-strength aluminum conductor and the terminal. The terminal is attached to the cable (the terminal end of the cable) through the wire barrel and the insulation barrel respectively holding a conductor portion and an insulation coating-covered portion of the cable, and is thus integral with the conductor portion and the insulation coating-covered portion. The insulation coating-covered portion is covered with an insulation coating. The conductor portion is exposed through removal of the insulation coating from the cable. The sealant embedding part spans across the insulation coating-covered portion and the exposed conductor portion having the terminal attached thereto.

<Wire Harness of Present Invention>

Furthermore, it is preferable that the cable be configured as a wire harness by crimping a crimp terminal onto the terminal end of the cable, in terms of corrosion and electrical corrosion. The crimp terminal includes a crimp part and a sealing part. The crimp part allows crimping onto the conductor portion of the cable. The crimp part of the crimp terminal is constructed by deforming a plate so as to form at a hollow shape in a cross section. The crimp part of the crimp terminal is constructed by welding the deformed plate having the hollow shape in a longitudinal direction of the crimp part. The sealing part is located on one longitudinal end of the crimp part having the hollow shape and is formed by welding the deformed plate having the hollow shape in a planar overlapped state in a direction intersecting the longitudinal direction of the crimp part.

More preferably, in terms of preventing corrosion or electrical corrosion, the wire harness comprises a water-repellent layer on a surface region of the conductor portion of the cable located opposite to an opening in the crimp part.

Preferably, the moored mobile body according to the present invention includes the cable having the above-described configuration, the connection structure including the cable, or the wire harness including the cable.

<Properties of High-Strength Aluminum-Based Conductor of Cable of Present Invention>

[Tensile Strength]

The value of the tensile strength is measured in accordance with JIS Z2241:2011. Detailed description of conditions for the measurement will be given in the description of working examples given below. The high-strength aluminum-based conductor of the present invention may be a wire rod. In such a case, in particular, the high-strength aluminum-based conductor preferably has a tensile strength of 180 MPa or more. This tensile strength is greater than the tensile strength, which is 60 MPa to 170 MPa, of the conducting aluminum A1350 specified by ASTM INTERNATIONAL (standard specification: B230/B230M-07). Application of the aluminum alloy wire rod of the present invention to a cable, for example, therefore produces an effect of reducing the cross-sectional area and the weight of the conductor of the cable by 10% while maintaining a high tensile strength of the cable. More preferably, the tensile strength of the present invention is 260 MPa or more. Further preferably, the tensile strength is 300 MPa or more. Still more preferably, the tensile strength is 340 MPa or more. These values of the tensile strength are greater than the tensile strength, which is 305 MPa to 330 MPa, of the 6000-series aluminum alloy A6201 specified by ASTM INTERNATIONAL (standard specification: B398/B398M-14). Further preferably, the tensile strength is 380 MPa or more. Particularly preferably, the tensile strength is 500 MPa or more.

[Fatigue Resistance]

The fatigue resistance was evaluated by measuring the electric resistance while repeating a cycle of winding and releasing (unwinding) of the cable onto and from a reel having a diameter of 20 cm, and determining the number of repetitions when an increase in the electric resistance due to deformation reached or exceeded 10% of the initial resistance.

[Electrical Conductivity]

The electrical conductivity, which varies depending on whether or not the voltage is boosted, is preferably 35% IACS or more, and more preferably 42% IACS or more. As a reference, a conductor having an electrical conductivity of 35% IACS or more and a cross-sectional area of 0.75 sq has an electrical conductivity of 65 Ω/km or less.

<Moored Mobile Body of Present Invention>

The moored mobile body of the present invention can be applied not only to the aerial drones described above but also to various other mobile bodies that move while being moored, such as underwater drones, which are used for exploration and image capture in oceans and rivers, and monitoring of various cables installed underwater like submarine cables and underwater cables, and amphibious drones, which are capable of moving into the air out of the water.

An embodiment of the present invention has been described above. However, the present invention is not limited to the embodiment described above and encompasses all aspects within the spirit of the present invention and the scope of the appended claims. A variety of modifications and variations can be made without departing from the scope of the present invention.

EXAMPLES

An aerial drone, which is a moored mobile body having the cable according to the present invention, was produced as a test model. The following describes property evaluations performed using the aerial drone. Note that Inventive Examples described below are only some of possible examples and are disclosed in order to merely illustrate the effects of the present invention. The present invention is not limited exclusively to these Inventive Examples.

Inventive Examples 1 to 7

As the aerial drone, a hexacopter (model number: Matrice 600, manufactured by DJI JAPAN) having a vehicle weight of 8.9 kg and including six rotor blades (propeller) was used. The propeller had a diameter of 21 inches. The drone had a carbon shaft and a motor having a rotation speed per volt of 130 rpm/V. The rotation speed of the motor was controlled using an electronic speed controller. The drone further had a 6 kg aerial camera.

Cables each having a structure and characteristics shown in Table 1, such as materials and element wire diameter of a conductor(s) and a tension member included in the cable, were used to perform mooring of and power supply to the aerial drone. Each cable had an overall length of 200 meters and a stranded conductor area of 0.75 sq. Each conductor was covered with a polypropylene coating. A polyethylene sheath was provided over the outer side of the coating.

Each cable was used to perform mooring of the drone and power supply to the drone with a power obtained by boosting the voltage from 100 V to 400 V in a power supply unit forming a unit assembly placed on the ground. The power supply to the drone was performed after stepping down the voltage from 250 V to 22 V using a DC-DC converter mounted in the aerial drone for the current flowing through the cable.

The cables including a high-strength aluminum alloy as a conductor had a mass of 2.4 kg (Inventive Examples 1, 2, and 5 to 7). The cable including soft copper as a conductor had a mass of 4.4 kg (Comparative Example 5). The cable including a high-strength aluminum alloy and soft copper as conductors had a mass of 3.0 kg (Inventive Example 3).

[Evaluation]

With respect to each of the cables of the Inventive Examples and the Comparative Examples, properties were evaluated as described below using the drone having the cable connected thereto.

[1] Tensile Strength

The tensile strength (MPa) of the stranded conductor in each of the cables prepared was measured by carrying out a tensile test using a precision universal tester (manufactured by Shimadzu Corporation) in accordance with JIS Z2241: 2011. The passing level for each working example was: the tensile strength of the conductor forming the cable is 180 MPa or more. The measurement was performed on the bare stranded conductor obtained by removing the sheath and the coating. The stress was calculated by dividing the maximum value of the test force by the total cross-sectional area of the strand yet to be tested.

[2] Fatigue Resistance

The fatigue resistance was evaluated by repeating a cycle of takeoff and landing of the drone between a location on the ground and a location at a height of 200 m, and determining the number of repetitions when an increase in the conductor resistance of 5% was reached. Note that the "number of repetitions when an increase in the conductor resistance of 5% was reached" means the number of cycles of takeoff and landing repeated until the drone was no longer able to make a flight. Every time the drone makes a flight, tension and bending due to winding onto the reel and releasing from the reel accompanying the flight act on the cable (electrical wire). Influences thereof give rise to a change in the electric resistance of the electrical wire. The electric resistance was therefore measured each time the drone made a flight, and the drone was determined to be no longer able to make a flight once an increase in the electric resistance from the initial resistance due to deformation reached or exceeded 10%. Regarding the fatigue resistance, the passing level for each working example was: the number of repetitions of the cycle of takeoff and landing is at least 10.

[3] Resistance (Electrical Conductivity) of Stranded Wire

The resistance of each stranded wire was measured through four-terminal sensing at 20±1° C. The passing level for each working example was: the resistance of the stranded wire having a cross-sectional area of 0.75 sq is 65 Ω/km or less.

TABLE 1

| | | Cable | | | | |
|---|---|---|---|---|---|---|
| | | Conductor 1 | | | Conductor 2 | |
| | Cable structure (type, quantity, element wire dimeter, etc. of components] | Material | Twisted structure (element wire diameter) etc. | Average value of dimension perpendicular to longitudinal direction of crystal grains | Material | Twisted structure (element wire diameter) etc. |
| Inventive Example 1 | Stranded wire aggregate of conductor 1 | A6201 | φ0.18 × 30 | 100 nm | — | — |
| Inventive Example 2 | Stranded wire aggregate of conductor 1 | A6201 | φ0.18 × 30 | 200 nm | — | — |
| Inventive Example 3 | Stranded wire aggregate of randomly arranged conductors 1 and 2 | A6201 | φ0.18 × 20 | 100 nm | Soft copper- | φ0.18 × 10 |
| Inventive Example 4 | Stranded wire aggregate of conductor 1, aramid fiber tension member, and optical fiber communication wire in triangular arrangement | A6201 | φ0.18 × 30 | 200 nm | — | — |
| Comparative Example 1 | Stranded wire aggregate of conductor 1 | A6201 | φ0.18 × 30 | 700 nm | — | — |
| Inventive Example 5 | Stranded wire aggregate of conductor 1 | A5053 | φ0.18 × 30 | 100 nm | — | — |
| Comparative Example 2 | Stranded wire aggregate of conductor 1 | A5053 | φ0.18 × 30 | 800 nm | — | — |
| Inventive Example 6 | Stranded wire aggregate of conductor 1 | A8083 | φ0.18 × 30 | 200 nm | — | — |
| Comparative Example 3 | Stranded wire aggregate of conductor 1 | A8083 | φ0.18 × 30 | 700 nm | — | — |
| Inventive Example 7 | Stranded wire aggregate of conductor 1 | A1050 | φ0.18 × 30 | 100 nm | — | — |

TABLE 1-continued

| | | | | | | |
|---|---|---|---|---|---|---|
| Comparative Example 4 | Stranded wire aggregate of conductor 1 | A1050 | φ0.18 × 30 | 800 nm | — | — |
| Comparative Example 5 | Stranded wire aggregate of conductor 1 | Soft copper | φ0.18 × 30 | 20 μm | — | — |

| | | Cable | | | | |
|---|---|---|---|---|---|---|
| | | Tension member Other | | Property evaluations | | |
| | | | | Tensile strength of stranded wire (MPa) | Resistance of stranded wire (Ω/km) | Fatigue resistance of cable (Times) |
| | | Material | Diameter, etc. | | | |
| Inventive Example 1 | Stranded wire aggregate of conductor 1 | — | — | 570 | 49.1 | 50 times or more |
| Inventive Example 2 | Stranded wire aggregate of conductor 1 | — | — | 430 | 45.9 | 50 times or more |
| Inventive Example 3 | Stranded wire aggregate of randomly arranged conductors 1 and 2 | — | — | 360 | 39.6 | 50 times or more |
| Inventive Example 4 | Stranded wire aggregate of conductor 1, aramic fiber tension member, and optical fiber communication wire in triangular arrangement | Aramid fiber optical fiber | Cross-sectional area 0.5 mm² and 0.9 mm core | 430 | 45.9 | 50 times or more |
| Comparative Example 1 | Stranded wire aggregate of conductor 1 | — | — | 160 | 41.8 | 2 times |
| Inventive Example 5 | Stranded wire aggregate of conductor 1 | — | — | 400 | 51.3 | 36 times |
| Comparative Example 2 | Stranded wire aggregate of conductor 1 | — | — | 120 | 51.1 | 6 times |
| Inventive Example 6 | Stranded wire aggregate of conductor 1 | — | — | 250 | 39.5 | 28 times |
| Comparative Example 3 | Stranded wire aggregate of conductor 1 | — | — | 100 | 39.3 | 2 times |
| Inventive Example 7 | Stranded wire aggregate of conductor 1 | — | — | 200 | 37.9 | 10 times |
| Comparative Example 4 | Stranded wire aggregate of conductor 1 | — | — | 60 | 37.7 | 1 time |
| Comparative Example 5 | Stranded wire aggregate of conductor 1 | — | — | 230 | 23.1 | 50 times or more |

Evaluation results shown in Table 1 indicate that the tensile strength, the electrical conductivity (resistance of stranded wire), and the fatigue resistance of the cables of Inventive Examples 1 to 7 were all at or above the respective passing levels. In contrast to Comparative Example 5, in which a soft copper conductor was used, Inventive Examples 1 to 7 each achieved a reduction of approximately 2 kg in the weight of the cable.

By contrast, with respect to each of Comparative Examples 1 to 4, in which a conventional aluminum conductor was used as the conductor forming the cable, the overall weight of the cable was small enough for the drone to ascend to a location at a height of 200 m, but the fatigue resistance was poor because the conductor had an insufficient tensile strength. With respect to Comparative Example 5, in which a soft copper conductor was used as the conductor forming the cable, the overall weight of the cable was large. As a result, the drone was unable to ascend to a location at a height of 200 m and stopped midway.

EXPLANATION OF REFERENCE NUMERALS

1: Cable
2: Moored mobile body (or drone)
3: Imaging device (or camera)
4: Winding unit (or cable reel)
5: Power supply unit
6: Unit assembly

The invention claimed is:

1. A cable for connecting a moored mobile body to a unit assembly including a power supply unit, for use at least in mooring of the moored mobile body to the unit assembly and in supplying power from the power supply unit to the moored mobile body, the cable comprising:
    a conductor constituted with element wires, at least part of the element wires being a high-strength aluminum-based conductor having a fibrous metal structure in which crystal grains uniformly extend in an extending direction of the high-strength aluminum-based conductor, and the crystal grains have an average value of less than or equal to 500 nm with respect to a dimension perpendicular to a longitudinal direction of the crystal grains on a cross section thereof parallel to the extending direction; and
    wherein the cable having a tensile strength of 180 MPa or more and 570 MPa or less.

2. The cable according to claim 1, wherein the high-strength aluminum-based conductor is composed of an 8000-series aluminum alloy.

3. The cable according to claim 1, wherein the high-strength aluminum-based conductor is composed of a 5000-series aluminum alloy.

4. The cable according to claim 1, wherein the high-strength aluminum-based conductor is composed of a 6000-series aluminum alloy.

5. The cable according to claim 1, wherein the high-strength aluminum-based conductor has an element wire diameter of less than or equal to 0.35 mm.

6. The cable according to claim 1, wherein the high-strength aluminum-based conductor is coated with copper, nickel, silver, or tin.

7. The cable according to claim 1, wherein the conductor of the cable includes the high-strength aluminum-based conductor and an additional conductor twisted together.

8. The cable according to claim 1, further comprising an optical fiber.

9. The cable according to claim 1, further comprising a tension member.

10. The cable according to claim 1, wherein the unit assembly further includes a winding unit capable of winding and unwinding the cable.

11. A connection structure comprising:
the cable according to claim 1;
a terminal having a crimp part crimped onto a terminal end of the conductor and a connector part connected to a mating terminal; and
an ultraviolet curable resin coating an outer surface region including at least an area where the conductor of the cable and the crimp part are crimped together.

12. A moored mobile body comprising
a cable for connecting a moored mobile body to a unit assembly including a power supply unit, for use at least in mooring of the moored mobile body to the unit assembly and in supplying power from the power supply unit to the moored mobile body, the cable comprising a conductor constituted with element wires, at least part of the element wires being a high-strength aluminum-based conductor; and
the connection structure according to claim 11.

13. A connection structure comprising:
the cable according to claim 1;
a terminal having a wire barrel and an insulation barrel; and
a sealant embedding part made from a liquid silicone rubber having an elastic modulus in a range of from 0.55 MPa to 0.72 MPa as measured by curing the liquid silicone rubber at 25° C.,
the terminal being attached to the cable through the wire barrel and the insulation barrel respectively holding a conductor portion and an insulation coating-covered portion of the cable, the terminal being thus integral with the conductor portion and the insulation coating-covered portion, the conductor portion being exposed through removal of the insulation coating from the cable,
the sealant embedding part being formed so as to cover the exposed conductor portion having the terminal attached thereto and the insulation coating-covered portion.

14. A wire harness comprising:
the cable according to claim 1; and
a crimp terminal crimped onto a terminal end of the cable,
the crimp terminal including a crimp part and a sealing part, the crimp part allowing crimping onto a conductor portion of the cable,
the crimp part of the crimp terminal being constructed by deforming a plate so as to form at a hollow shape in a cross section and welding the deformed plate having the hollow shape in a longitudinal direction of the crimp part,
the sealing part being located on one longitudinal end of the crimp part having the hollow shape and being formed by welding the deformed plate having the hollow shape in a planar overlapped state in a direction intersecting the longitudinal direction of the crimp part.

15. The wire harness according to claim 14, comprising a water-repellent layer on a surface region of the conductor portion of the cable located opposite to an opening in the crimp part.

* * * * *